United States Patent
Pietron et al.

(10) Patent No.: US 8,844,379 B2
(45) Date of Patent: Sep. 30, 2014

(54) TRANSMISSIONS WITH ELECTRONICS INTERFACE ASSEMBLY FOR TORQUE SENSOR

(71) Applicant: Ford Global Technologies, LLC, Dearborn, MI (US)

(72) Inventors: Gregory Michael Pietron, Canton, MI (US); Nimrod Kapas, Canton, MI (US); Joseph F. Kucharski, Livonia, MI (US); Steven Adam Hermann, Fenton, MI (US); Christopher Gregory Garbacz, Livonia, MI (US); Yuji Fujii, Ann Arbor, MI (US); Diana Yanakiev, Birmingham, MI (US); Roberto Teran, Jr., Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/910,181

(22) Filed: Jun. 5, 2013

(65) Prior Publication Data

US 2013/0263654 A1  Oct. 10, 2013

Related U.S. Application Data

(63) Continuation-in-part of application No. 13/114,366, filed on May 24, 2011.

(51) Int. Cl.
*G01L 3/02* (2006.01)
*G01M 13/02* (2006.01)
*G01L 3/10* (2006.01)

(52) U.S. Cl.
CPC .. *G01L 3/101* (2013.01); *G01L 3/10* (2013.01)
USPC ................... 73/862.193; 73/115.02

(58) Field of Classification Search
USPC ........................ 73/862.193, 115.02
See application file for complete search history.

(56) References Cited

U.S. PATENT DOCUMENTS

| | | | |
|---|---|---|---|
| 4,760,745 A * | 8/1988 | Garshelis | 73/862.333 |
| 4,882,936 A * | 11/1989 | Garshelis | 73/862.333 |
| 4,887,461 A | 12/1989 | Sugimoto et al. | |
| 4,891,992 A * | 1/1990 | Kobayashi et al. | 73/862.335 |
| 4,896,544 A * | 1/1990 | Garshelis | 73/862.333 |
| 4,899,597 A | 2/1990 | Yagi et al. | |
| 5,092,182 A | 3/1992 | Ikeda et al. | |
| 5,165,286 A | 11/1992 | Hamamura et al. | |
| 5,493,921 A | 2/1996 | Alasafi et al. | |
| 5,526,704 A | 6/1996 | Hoshina et al. | |

(Continued)

FOREIGN PATENT DOCUMENTS

| | | |
|---|---|---|
| JP | 63312551 A | 12/1988 |
| JP | 64021255 | 1/1989 |
| JP | 04052537 | 2/1992 |
| JP | 04052538 | 2/1992 |

*Primary Examiner* — Eric C McCall
*Assistant Examiner* — Jamel Williams
(74) *Attorney, Agent, or Firm* — James Dottavio; Brooks Kushman P.C.

(57) ABSTRACT

A transmission includes sensors positioned adjacent respective pairs of magnetized bands on a shaft of the transmission for detecting magnetic flux emanating from the bands in response to torque on the shaft. The transmission further includes an electronics interface assembly configured to respectively provide drive signals to the sensors and to receive from the sensors, in response to the drive signals, output signals indicative of the torque on the shaft as detected by the sensors.

15 Claims, 10 Drawing Sheets

(56) References Cited

U.S. PATENT DOCUMENTS

| | | | |
|---|---|---|---|
| 5,708,216 A * | 1/1998 | Garshelis | 73/862.335 |
| 6,047,605 A * | 4/2000 | Garshelis | 73/862.336 |
| 6,260,421 B1 | 7/2001 | Torbjornsson et al. | |
| 6,490,934 B2 * | 12/2002 | Garshelis | 73/862.336 |
| 6,581,480 B1 * | 6/2003 | May et al. | 73/862.333 |
| 6,688,445 B2 | 2/2004 | Otto | |
| 6,698,299 B2 | 3/2004 | Cripe | |
| 6,846,260 B2 | 1/2005 | Horiuchi | |
| 7,243,557 B2 | 7/2007 | May | |
| 7,258,949 B2 | 8/2007 | Frederiksson et al. | |
| 7,491,145 B2 | 2/2009 | Mizon et al. | |
| 7,579,827 B2 | 8/2009 | Burns et al. | |
| 7,685,891 B2 | 3/2010 | May | |
| 2005/0160835 A1 * | 7/2005 | Masaki et al. | 73/862.333 |
| 2009/0293642 A1 * | 12/2009 | Schmitz | 73/862.331 |
| 2010/0043570 A1 * | 2/2010 | Grab et al. | 73/862.335 |

* cited by examiner (Background)

*(Background)*

*(Background)*

*(Background)*

*(Background)*

TRANSMISSIONS WITH ELECTRONICS INTERFACE ASSEMBLY FOR TORQUE SENSOR

CROSS-REFERENCE TO RELATED APPLICATIONS

This application is a continuation-in-part of U.S. application Ser. No. 13/114,366, filed May 24, 2011, which is hereby incorporated by reference in its entirety.

TECHNICAL FIELD

The present invention relates to automatic transmissions having torque sensors.

BACKGROUND

An automatic transmission of a vehicle includes an input shaft and an output shaft. The input shaft receives an input torque at an input speed from power derived from a power source such as an engine. The transmission converts the input torque at the input speed to an output torque at an output speed. The output shaft transmits the output torque at the output speed to traction wheels of the vehicle to propel the vehicle.

The transmission converts the input torque at the input speed to the output torque at the output speed by adjusting a gear ratio (for example, during an up-shift or down-shift) between the shafts. The transmission shifting is accomplished by applying and/or releasing friction elements (such as clutches, band-brakes, etc.) to change speed and torque relationships by altering planetary gear configurations of the transmission. As a result, power flow paths are established and disestablished from the engine to the wheels.

The friction elements have to be properly controlled to satisfactorily shift the transmission. To this end, information regarding the operation of the transmission is used to control the friction elements. For instance, information indicative of the input torque received by the input shaft and the speed of the input shaft may be used. Similarly, information indicative of the output torque transmitted by the output shaft and the speed of the output shaft may be used.

Torque and speed of the input and output shafts may be estimated based on available information. On the other hand, magnetic sensors mounted within the transmission can directly detect the actual torque and speed of the input and output shafts. However, installation and packaging of such sensors within limited spaces of the transmission presents challenges.

SUMMARY

Embodiments of the present invention are directed to transmissions having electronic interface assemblies for magnetic torque and/or speed (i.e., "torque") sensors configured to sense torque and/or speed of input and/or output shafts in the transmissions.

In one embodiment, the present invention provides a transmission including sensors positioned adjacent respective pairs of magnetized bands on a shaft for detecting magnetic flux emanating from the bands in response to torque on the shaft. The transmission further includes an electronics interface assembly configured to respectively provide drive signals to the sensors and to receive from the sensors, in response to the drive signals, output signals indicative of the torque on the shaft as detected by the sensors.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
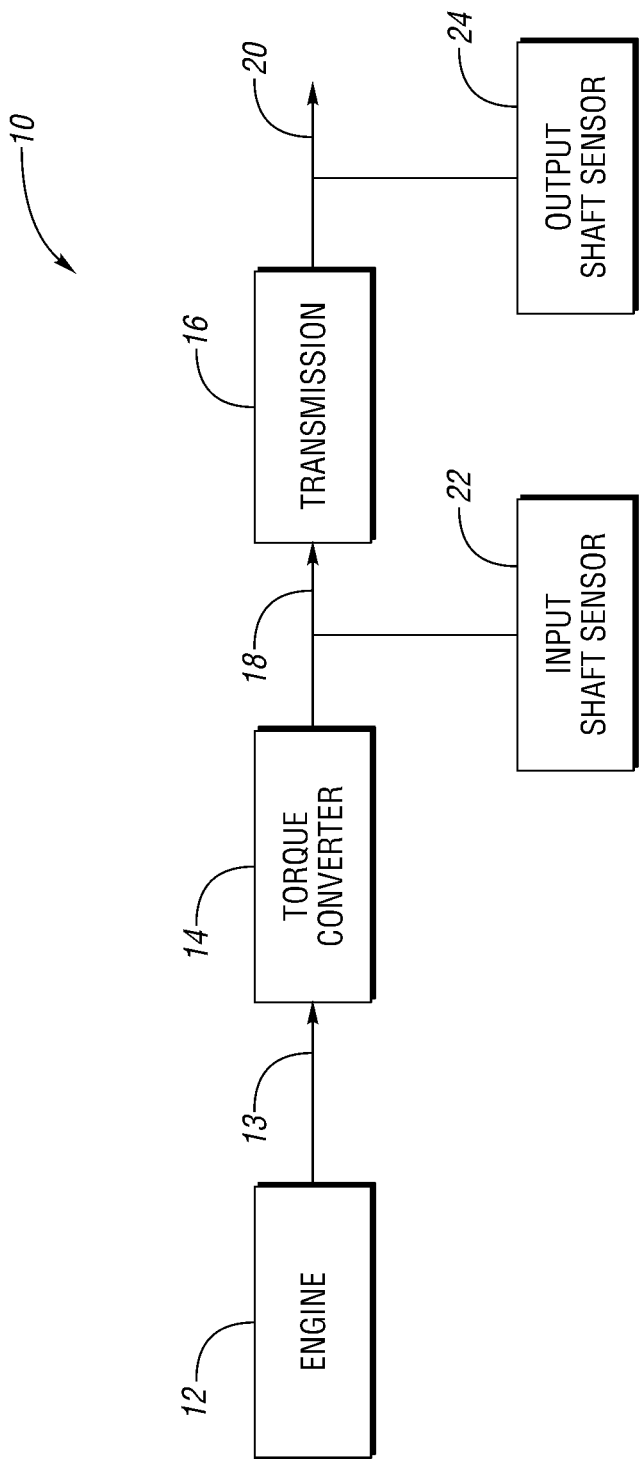
FIG. 1 illustrates a block diagram of a vehicle powertrain in accordance with embodiments of the present invention.

Referring now to FIG. 1, a block diagram of a vehicle powertrain 10 in accordance with embodiments of the present invention is shown. Powertrain 10 includes an engine 12, a torque converter 14, and an automatic transmission 16. Transmission 16 has an input shaft 18 and an output shaft 20. Engine 12 delivers torque to torque converter 14 via crankshaft 13 of engine 12 which is connected to torque converter 14. Torque converter 14 converts the engine torque into an input torque at an input speed and transmits the input torque at the input speed to input shaft 18 of transmission 16. Transmission 16 serves to change a transmission ratio and thus changes the input torque at the input speed into an output torque (for example, increased torque) at an output speed (for example, reduced speed). Transmission 16 transmits the output torque at the output speed to output shaft 20. Output shaft 20 is connected to a vehicle driveline (not shown) such that the output torque at the output speed may be used to drive wheels of the vehicle.

Powertrain 10 further includes at least one of an input shaft sensor 22 and an output shaft sensor 24. Input sensor 22 is associated with input shaft 18 and is configured to monitor at least one of (input) torque and (input) speed of input shaft 18. Similarly, output sensor 24 is associated with output shaft 20 and is configured to monitor at least one of (output) torque and (output) speed of output shaft 20. Input and output sensors 22 and 24 provide sensor signals indicative of the monitored information to a power control module (PCM) (not shown) for the PCM to control operation of transmission 16.

Figure 2:
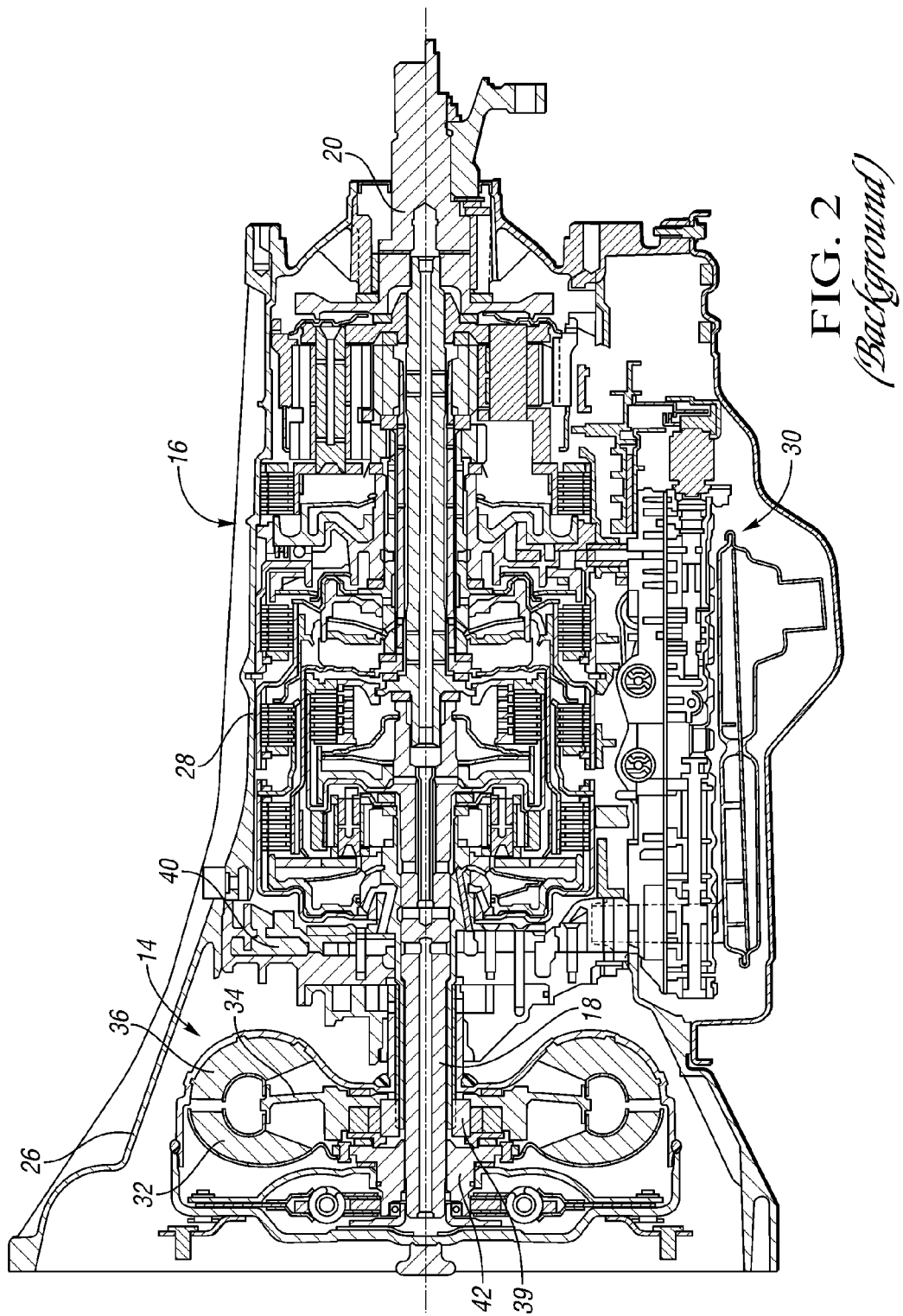
FIG. 2 illustrates a cross-sectional view of an exemplary torque converter and an exemplary transmission for the powertrain shown in FIG. 1.

Referring now to FIG. 2, with continual reference to FIG. 1, a cross-sectional view of an exemplary torque converter 14 and an exemplary transmission 16 for powertrain 10 is shown. As shown in FIG. 2, torque converter 14 is encased within a torque converter case 26 and transmission 16 is encased within a transmission case 28.

Transmission 16 includes a transmission mechanism 30. Transmission mechanism 30 is configured to change the input torque at the input speed received by input shaft 18 into an output torque at an output speed transmitted by output shaft 20. As illustrated in the right-hand side of FIG. 2, transmission mechanism 30 uses planetary gear sets.

Torque converter 14 includes a turbine 32, a stator 34, and an impeller 36. Impeller 36 is fixedly connected to engine crankshaft 13 such that impeller 36 rotates as crankshaft 13 rotates. Stator 34 is fixed onto the stator shaft (i.e., the stator tube) of a stator support 40 via a one-way clutch 39. Stator support 40 is fixed to transmission case 28. Turbine 32 is mechanically linked via a turbine hub 42 to input shaft 18.

Transmission 16, as shown in FIG. 2, does not have either an input sensor 22 for directly measuring torque and/or speed of input shaft 18 or an output sensor 24 for directly measuring torque and/or speed of output shaft 20.

Transmissions in accordance with embodiments of the present invention include an input sensor 22 and/or an output sensor 24 packaged therein. The packaging of an input sensor 22 and/or output sensor 24 within a transmission enables direct measurement of torque and/or speed of input shaft 18 and/or output shaft 20. Sensors 22 and 24 may be magnetic torque sensors for monitoring torque of input and output shafts 18 and 20, respectively. Likewise, sensors 22 and 24 may be magnetic speed sensors for monitoring speed of shafts 18 and 20, respectively. Further, sensors 22 and 24 may be magnetic torque and speed sensors for monitoring torque and speed of shafts 18 and 20, respectively.

Magnetic torque and speed sensor technology operates optimally with a free smooth surface area on a shaft with constant diameter and controlled hardness, wherein a part of the shaft is magnetized. The magnetic sensor technology makes use of magnetic flux sensing elements such as fluxgates. The sensing elements are preferably stationary and fixed with respect to the rotating magnetized surface of the shaft. Translation of the shaft in either the axial or radial direction relative to the sensor housing is preferably minimized. Conventional transmission designs, such as shown in FIG. 2, may represent a challenge for packaging of magnetic sensors.

Input and output sensors 22 and 24 may be magneto-elastic sensors as described in U.S. Pat. Nos. 6,145,387; 6,047,605; 6,553,847; and 6,490,934. Other magnetic sensors may also be used to enable accurate measurements of torque exerted onto a rotating shaft and rotating speed of the shaft without physical contact between a magnetic flux sensing element of the sensor and the shaft.

Figure 3A:
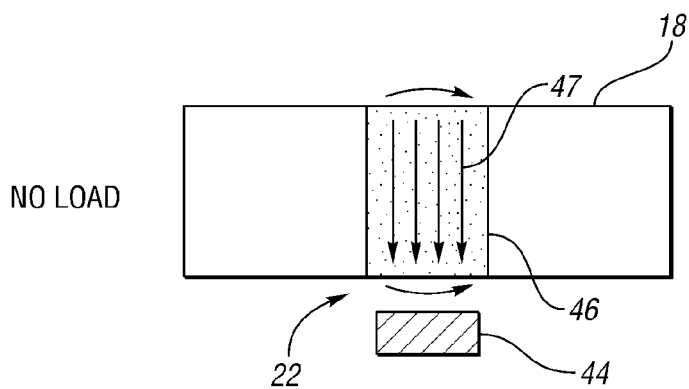
FIGS. 3A, 3B, and 3C illustrate an example of a magnetic torque sensor for detecting torque of a shaft.
Figure 3B:
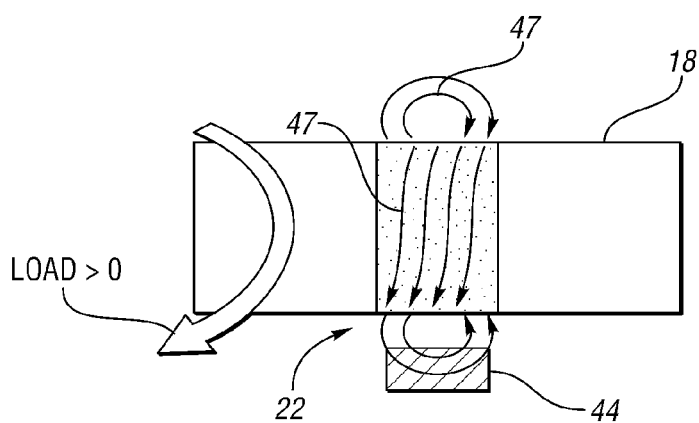
Figure 3C:
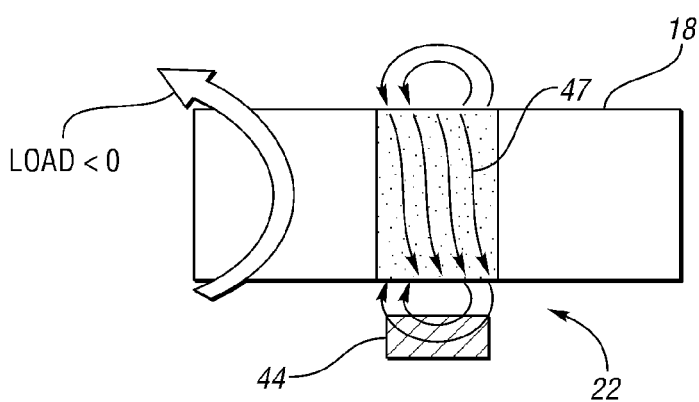

Referring now to FIGS. 3A, 3B, and 3C, an example of a magnetic torque sensor for detecting torque of a shaft will be described. This example assumes that the shaft is input shaft 18 and that the torque sensor is input sensor 22. Sensor 22 includes a magnetic flux sensing element(s) (e.g., a fluxgate(s)) within a sensor housing 44. Sensor housing 44 may include other types of sensing elements such as thermocouples. Shaft 18 includes a magnetized region 46. Magnetized region 46 circumferentially extends around shaft 18. Magnetized region 46 may be created by coating magnetized material as a thin layer on shaft 18 or by magnetizing shaft 18. Sensor housing 44 is fixed in position adjacent to the magnetized region 46 of shaft 18 to enable the sensing element of sensor 22 to sense the torque induced signal.

At no load (FIG. 3A), magnetic flux 47 is contained near or within the shaft surface. FIG. 3A shows a simplified view of flux direction. Depending on chosen magnetization patterns, magnetic flux may have more complex directional patterns. When load is applied (i.e., shaft 18 is twisted), magnetic flux 47 extends from the shaft surface and its axial component, which is proportional to the applied torque, is measured by the sensing element (FIGS. 3B and 3C). For instance, as shown in FIGS. 3B and 3C, magnetic flux 47 is realigned in one direction when the load is greater than zero and is realigned in the opposite direction when the load is less than zero. Either realignment causes more magnetic flux 47 to come out from the shaft surface in proportion to the load level. As indicated in FIGS. 3B and 3C, the sensing element detects the magnetic flux direction and intensity. Variations of this technology include, for example, dual band and tri-band magnetic torque sensors.

Figure 4:
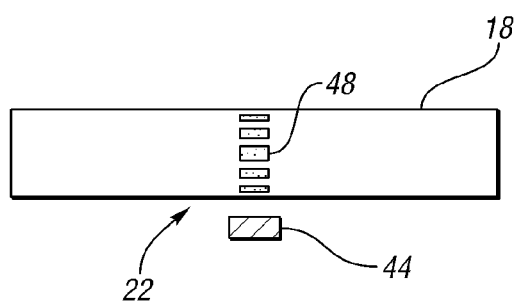
FIG. 4 illustrates an example of a magnetic speed sensor for detecting rotating speed of a shaft.

Referring now to FIG. 4, an example of a magnetic speed sensor for detecting rotating speed of a shaft will be described. Again, this example assumes that the shaft is input shaft 18 and that the speed sensor is input sensor 22. Sensor 22 includes sensor housing 44 having a magnetic flux sensing element(s) (e.g., a fluxgate). Shaft 18 includes a magnetized region 48 comprised of magnetic material placed in spots repeatedly around the circumference of shaft 18 as shown in FIG. 4. Sensor housing 44 is placed near the shaft surface. The sensing element of sensor 22 picks up the circumferential component of magnetic flux as shaft 18 rotates. Variations of this technology include, for example, dual band magnetic speed sensors.

Figure 5:
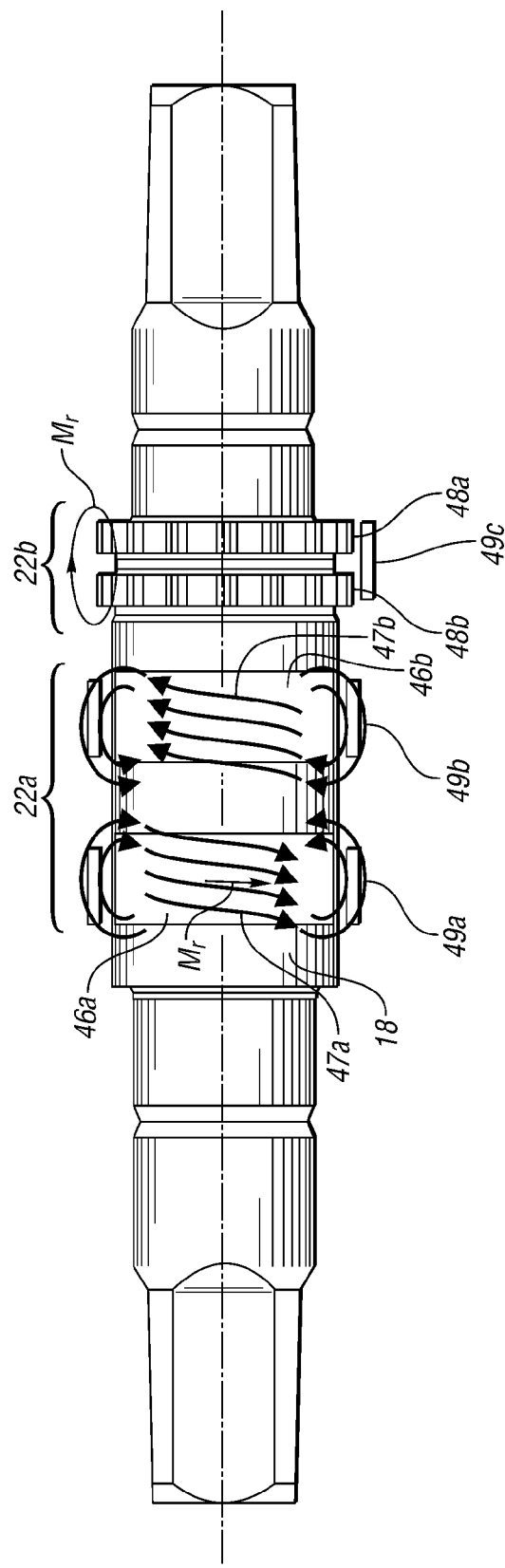
FIG. 5 illustrates another example of a magnetic torque sensor for detecting torque of a shaft and another example of a magnetic speed sensor for detecting rotating speed of a shaft.

Referring now to FIG. 5, with continual reference to FIGS. 3A-3C and 4, another example of a magnetic torque sensor for detecting torque of a shaft and another example of a magnetic speed sensor for detecting speed of a shaft will be described. Again, these examples assume that the shaft is input shaft 18, the torque sensor is a first input sensor 22a, and the speed sensor is a second input sensor 22b.

Regarding first input sensor 22a for detecting torque of shaft 18, as indicated above variations of the technology described with respect to FIGS. 3A-3C include dual and tri-band magnetic torque sensors. Sensor 22a is an example of a dual band torque sensor. To this end, shaft 18 includes a pair of magnetized regions 46a and 46b which circumferentially extend around shaft 18. Sensor 22a includes a pair of magnetic flux sensing elements 49a and 49b (e.g., a pair of fluxgates) within a sensor housing (not shown). The sensor housing is fixed in position adjacent to magnetized regions 46a and 46b of shaft 18 to enable sensing elements 49a and 49b of sensor 22 to sense the respective torque induced magnetic flux ($M_r$) 47a and 47b respectively emanating from magnetized regions 46a and 46b when load is applied (i.e., when shaft 18 is twisted).

Regarding second input sensor 22b for detecting rotating speed of shaft 18, as indicated above variations of the technology described with respect to FIG. 4 include dual band magnetic speed sensors. Sensor 22b is an example of a dual band speed sensor. To this end, shaft 18 includes a pair of magnetized bands 48a and 48b each having magnetic material placed in spots repeatedly around the circumference of shaft 18. Sensor 22b includes a magnetic flux sensing element 49c within a sensor housing (not shown). This sensor housing is fixed in position adjacent to magnetized bands 48a and 48b to sense the magnetic flux ($M_r$) emanating from magnetized bands 48a and 48b when shaft 18 rotates.

For simplicity, a magnetic torque and/or speed sensor is referred to herein as a "magnetic torque sensor" or simply "sensor". However, as described above, such a magnetic torque sensor or sensor may be a magnetic torque sensor only, a magnetic speed sensor only, or a magnetic torque and speed sensor.

Figure 6B:
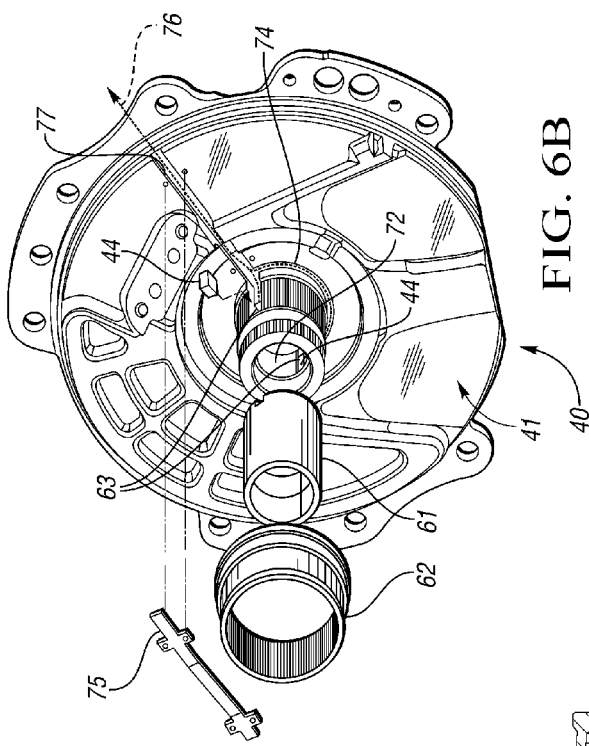
FIG. 6B illustrates an enlarged view of the front side of the stator support, as partially assembled, of the transmission shown in FIG. 6A.
Figure 6A:
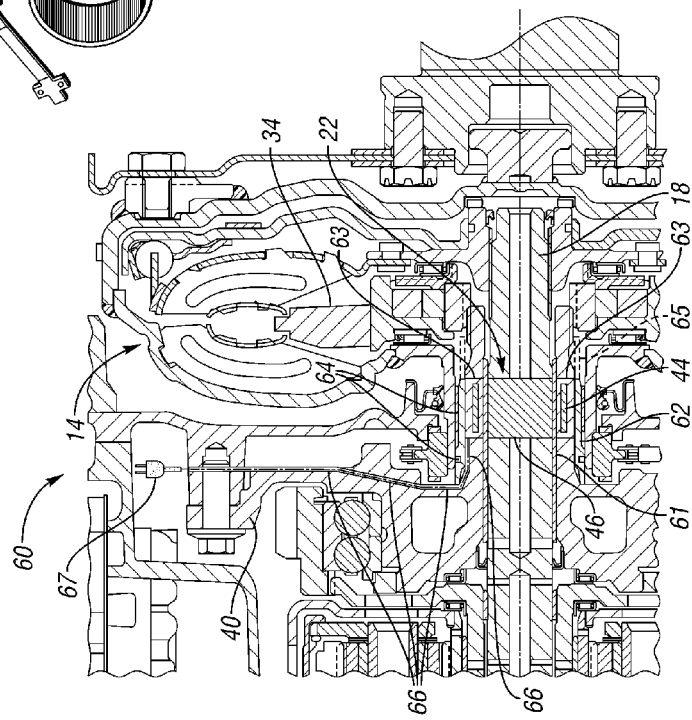
FIG. 6A illustrates a cross-sectional view of an automatic transmission having a magnetic torque sensor packaging design in accordance with an embodiment of the present invention.
Figure 6D:
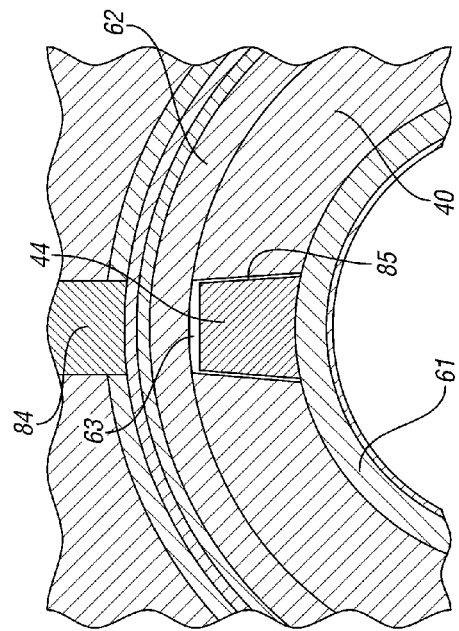
FIG. 6D illustrates a cross-sectional view of the area of the transmission shown in FIG. 6A near one of the sensor housings of the sensor.
Figure 6C:
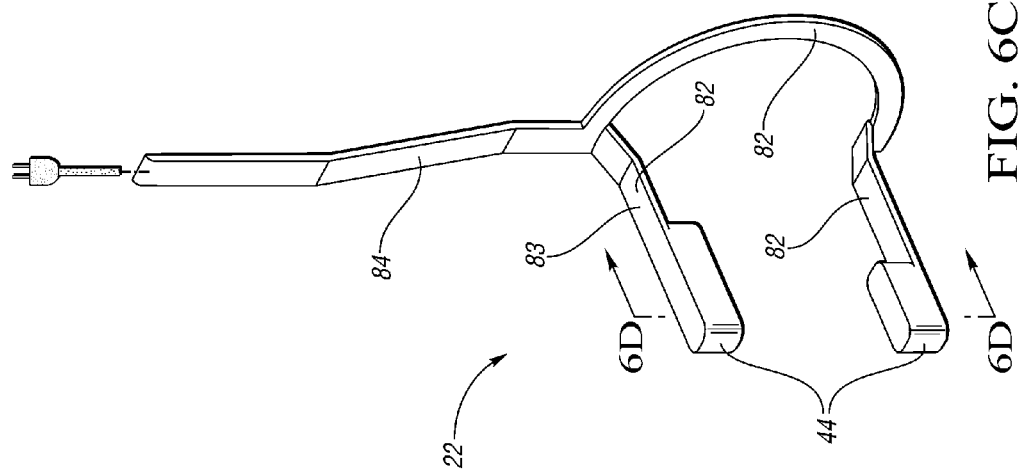
FIG. 6C illustrates an enlarged view of the wiring for the magnetic torque sensor of the transmission shown in FIG. 6A.
Figure 6F:
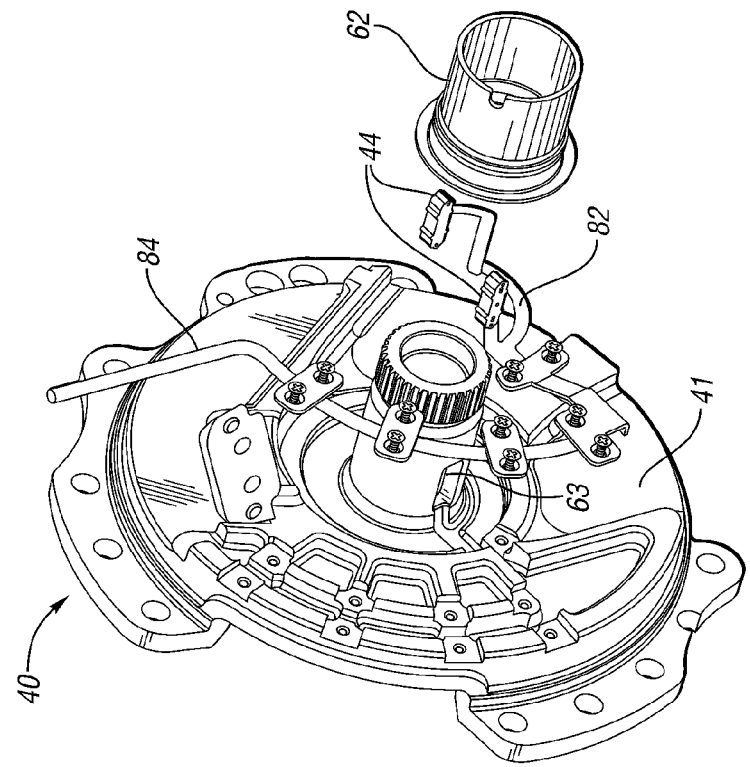
FIG. 6F illustrates another enlarged view of the front side of the stator support, as partially assembled, of the transmission shown in FIG. 6A.
Figure 6E:
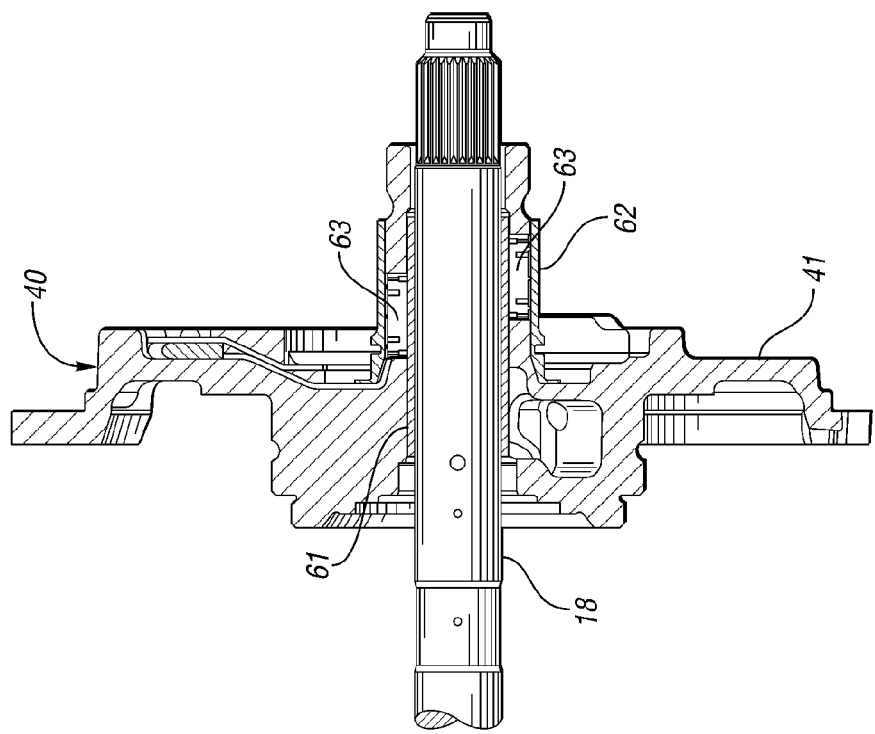
FIG. 6E illustrates a side view of the stator support of the transmission shown in FIG. 6A.
Figure 6G:
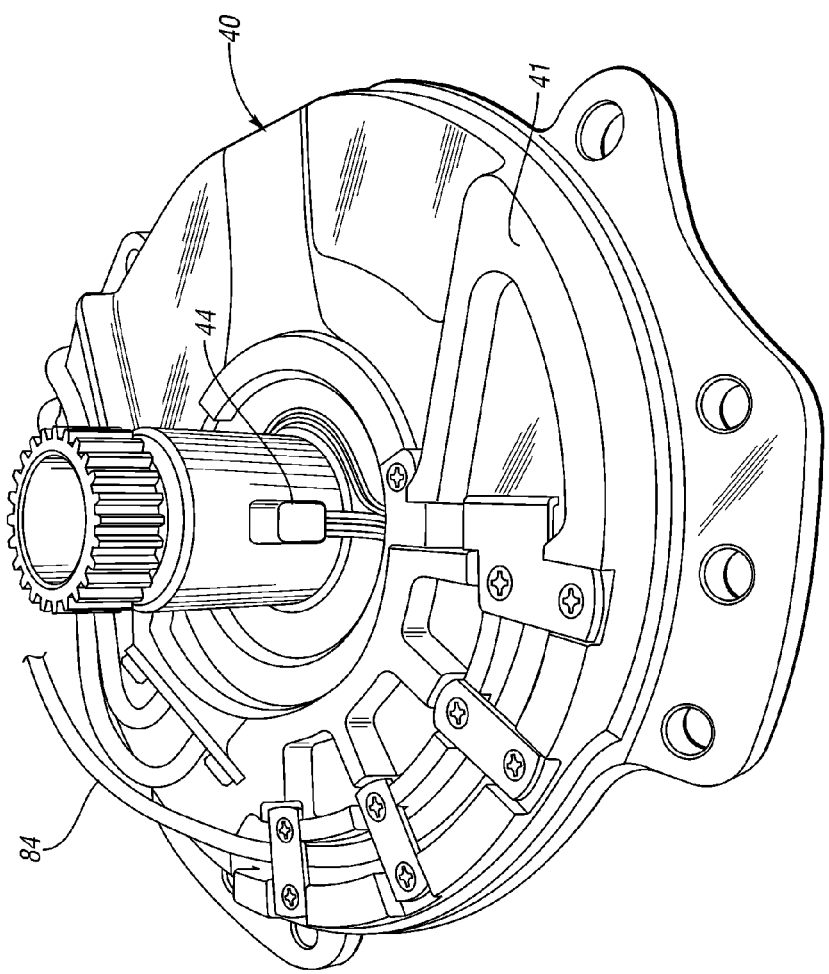
FIG. 6G illustrates a view of the front side of the stator support, as fully assembled, of the transmission shown in FIG. 6A.

Referring now to FIGS. 6A, 6B, 6C, 6D, 6E, 6F, and 6G, an automatic transmission 60 having a magnetic torque sensor packaging design in accordance with an embodiment of the present invention will be described. FIG. 6A illustrates a cross-sectional view of transmission 60; FIG. 6B illustrates an enlarged view of a front side 41 of stator support 40, as partially assembled, of transmission 60; FIG. 6C illustrates an enlarged view of the wiring for sensor 22 of transmission 60; FIG. 6D illustrates a cross-sectional view of the area of transmission 60 near one of sensor housings 44 of sensor 22; FIG. 6E illustrates a side view of stator support 40 of transmission 60; FIG. 6F illustrates another enlarged view of front side 41 of stator support 40, as assembled, of transmission 60; and FIG. 6G illustrates a view of front side 41 of stator support 40, as fully assembled, of transmission 60.

A general aspect of the sensor packaging design of transmission 60 includes packaging features of sensor 22 on the front side 41 of stator support 40 (i.e., on the side of stator support facing toward torque converter 14).

Sensor 22 includes two sensor housings 44 each having two pairs of sensing elements (e.g., two pairs of fluxgates). Sensor housings 44 are placed in upper and lower windows 63 cut into the stator shaft (i.e., the stator tube) of stator support 40 adjacent to magnetized regions 46a, 46b, and 46c (cf. FIGS. 7 and 8) of input shaft 18. A first press-fitted sleeve 61 seals the hydraulic passages of transmission 60 and retains sensor housings 44 from the inside surface of the stator shaft. A second press-fitted sleeve 62 retains sensor housings 44 from the outside surface of the stator shaft. Each window 63 is a hollowed-out portion of the stator shaft of stator support 40. As such, sensor housing 44 in respective windows 63 are encased within the stator shaft of stator support 40.

Windows 63 are positioned within the stator shaft of stator support 40 circumferentially away from hydraulic passages embedded in stator support 40.

To compensate for the effect of temperature on performance of sensor 22, it is desired to measure the surface temperature of shaft 18 at the magnetized region. For practical reasons, the temperature in the surrounding environment of shaft 18 is measured, instead of directly measuring the surface temperature of shaft 18. A temperature sensor (e.g., thermistor) (shown in FIGS. 7 and 8) is integrated into the sealed upper window 63 of sensor housing 44 and reads air temperature inside of upper window 63.

First sleeve 61 includes a backing plate and a bushing material layer. Both layers include magnetically permeable materials such as non-ferrous materials so that the sensing elements can sense through first sleeve 61. The backing plate and the bushing material layer have similar coefficients of thermal expansion. The bushing material at the internal diameter of first sleeve 61 supports shaft 18 on its journal surface. Sensor housings 44 are placed at an appropriate distance from the journal area of shaft 18 and the corresponding bushing area of first sleeve 61. This arrangement is to avoid mechanical work on the torque sensing surface and to prevent debris passing across the magnetic imprint on the shaft surface and impact the rotational signal uniformity of the signal of sensor 22. The distance between sensor housings 44 and the journal area of shaft 18 and the corresponding bushing area of first sleeve 61 also minimizes the effect of local heating/loading non-uniformities on the sensor performance.

Second sleeve 62 can be made of magnetic shield material, such as mu metal or permalloy, to protect the sensing elements from external magnetic interference and reduce zero offset variation of the sensing elements. As indicated at 64, second sleeve 62 provides a bushing riding surface and an O-ring groove. As indicated at 65, second sleeve 62 can be extended axially for better electromagnetic shielding. Sensor wiring is glued or otherwise affixed inside of grooves in stator support 40 as indicated at 66. Second sleeve 62 covers the wiring at the OD. The end of the wiring extending out of stator support 40 includes a connector 67 for connection to the PCM. As such, second sleeve 62 may be used as a bushing surface on the outside and provide a continuous surface for a seal with the front side of stator support 40.

In a variation, four sensor windows 63 offset by 90 degrees are cut into the stator shaft adjacent to magnetized regions 46 of input shaft 18 and four magnetic torque sensors are respectively positioned within these four windows 63. This configuration enables circumferential signal non-uniformities of the sensors to be more efficiently cancelled out than a configuration having only two sensors spaced apart by 180 degrees around the stator shaft.

Further aspects of the sensor packaging design for transmission 60 will be described. Windows 63 of the stator shaft may be angled to allow press fit. The assembled location of first sleeve 61 is indicated at reference numeral 72. Stator support 40 includes on its front side a circumferential groove 74 for combining wiring 82 from sensor housings 44 together. Circumferential groove 74 connects with an axial groove running along the stator tube. Wiring 82 can be in the form of ribbon wires or can be embedded inside of a plastic lead frame with appropriate stiffness, or can be contained within some protective cover. Stator support 40 further includes on its front side a radial groove 77 connected to circumferential groove 74. Wiring 84 of sensors further extends along radial groove 77. A cover plate 75 for covering radial groove 77 is bolted onto the front side of stator support 40. Cover plate 75 covers wiring 84 at the top of radial groove 77 such that grooves 74 and 77 are protected during subsequent assembly into the transmission housing (the wiring may be in the form of ribbon wires and placed into a closed groove at the subassembly level, or contained within some protective cover). Alternatively, wiring 84 can be embedded inside of a plastic lead frame that sits inside radial groove 77. Also, wiring 82 inside circumferential groove 74 can be embedded in a plastic lead frame with appropriate stiffness that connects sensor housings 44 together forming a single plastic part with circumferential wiring 82, sensor housings 44, and radial wiring 84. During assembly, sensor housings 44 snap into their windows 63 on stator support 40, and wirings 82 and 84 snap into their respective grooves 74 and 77. Wiring 84 extends out of stator support 40 from radial groove 77 as indicated at reference numeral 76.

As shown in FIGS. 6C and 6F, a retainer clip 83 connects wiring segments 82 and 84 to sensor housings 44. As shown in FIG. 6D, sensor housing 44 and its window has a small angle taper to facilitate snap-in of parts as indicated at 85.

Features of the sensor packaging design described with reference to FIGS. 6A-6G include one or more sensors 22 encased within the stator shaft (i.e., the stator tube) of stator support 40. Accordingly, this sensor packaging design represents a design in which the stator shaft of the stator support of an existing transmission may be retrofitted to include the hollowed-out containers 63 for sensors 22. Thus, the stator shaft of the stator support of an existing transmission does not have to be cylindrically recessed or the like to accommodate one or more sensors 22.

Figure 7:
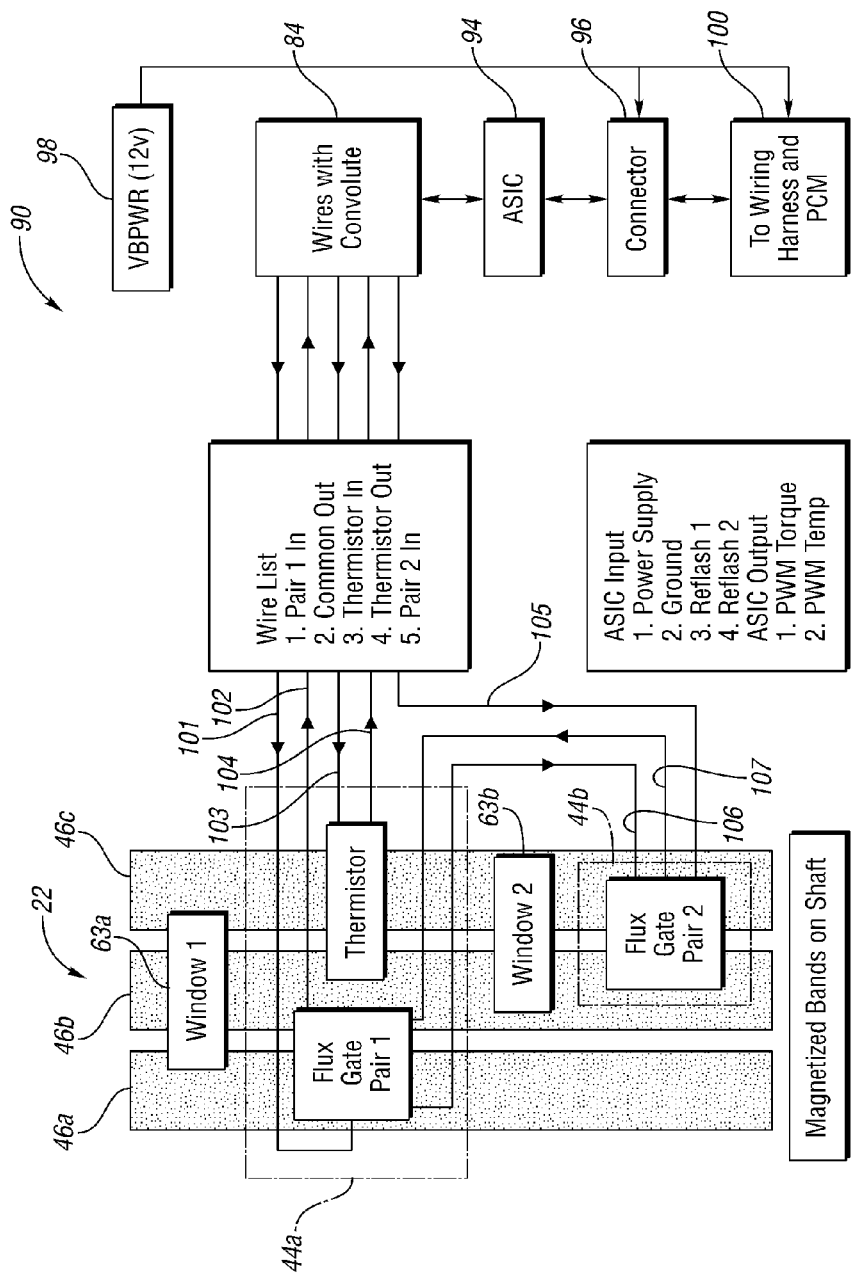
FIG. 7 illustrates a block diagram of a transmission shaft with an electronics interface assembly for a magnetic torque sensor in accordance with an embodiment of the present invention.

Referring now to FIG. 7, a block diagram of a transmission shaft with an electronics interface assembly 90 for a magnetic torque sensor in accordance with an embodiment of the present invention is shown. The transmission shaft is the shaft of a transmission such as transmission 60 described above with reference to FIGS. 6A-6G. Sensor 22 includes three magnetized regions 46a, 46b, 46c which circumferentially extend around the shaft. Sensor 22 includes two sensor housings 44a and 44b (i.e., top sensor housing 44a and bottom sensor housing 44b). Each sensor housing 44a, 44b includes therein a pair of magnetic flux sensing elements. Top sensor housing 44a further includes therein a thermistor. Sensor housings 44a, 44b are respectively placed in (top and bottom) windows 63a, 63b of the stator shaft of stator support 40 such that sensor housings 44 are respectively adjacent to magnetized regions 46a, 46b and magnetized regions 46b, 46c. As such, the pairs of sensing elements sense the torque induced magnetic flux respectively emanating from magnetized regions 46a, 46b and 46b, 46c when load is applied to the shaft.

Electronics interface assembly 90 includes wiring segments 82 and 84 ("84"), an application specific integrated circuit (ASIC) 94, and a connector 96. Wiring 84 runs from sensor housings 44a, 44b (more particularly, from the fluxgate pairs and the thermistor) and connects ASIC 94 and connector 96 to the fluxgate pairs and the thermistor and to each other. Connector 96 is connected to a power supply 98 for enabling power supply 98 to supply power to ASIC 94 for its operation. Connector 96 is also connected to a wiring harness of which PCM 100 is associated in order to enable ASIC 94 to communicate with PCM 100.

In general, ASIC 94 provides drive signals to the fluxgate pairs and receives corresponding output signals from the fluxgate pairs in order measure the torque of the shaft. ASIC 94 also provides a drive signal to the thermistor and receives a corresponding output signal from the thermistor in order to measure the temperature of the shaft. ASIC 94 provides the torque measurements and the temperature measurement of the shaft to PCM 100.

The shaft is circumferentially magnetized within a band as indicated. The application of torque to the shaft results in opposite magnetic poles forming on the opposite edges of the band, with a toroidal field being generated above the surface of the shaft. The fluxgates are configured to detect the toroidal field. Each fluxgate includes a core which is relatively easily saturated by the combination of a drive reference signal (e.g., a square wave) and the magnetic field generated by the magneto-elastic effect. In particular, ASIC 94 drives each fluxgate with a square wave signal, compares the output to the reference signal utilizing a Wheatstone bridge, and amplifies the measured voltage difference from the bridge to obtain the torque output signal.

A thermistor is located near the shaft as indicated. The thermistor is used to compensate for the change in the magneto-elastic effect caused by varying temperature. This gives electronics interface assembly 90 the additional tasks of driving the thermistor, reading the temperature (i.e., the temperature output signal), and adjusting the torque output signal according to the temperature.

As shown in FIG. 7, wiring 84 of electronics interface assembly 90 includes five individual wires between the two sensor housings 44 and ASIC 94. In particular, these five individual wires include: a first wire 101 labeled "Pair 1 In"; a second wire 102 labeled "Common Out"; a third wire 103 labeled "Thermistor In"; a fourth wire 104 labeled "Thermistor Out"; and a fifth wire 105 labeled "Pair 2 In." As further shown in FIG. 7, two individual wires of electronics interface assembly 90 are between sensor housing 44 themselves. In particular, these two individual wires include a sixth wire 106 and a seventh wire 107.

In operation, ASIC 94 provides a drive reference signal (i.e., a square wave signal) over first wire 101 to top sensor housing 44a and provides another drive reference signal over fifth wire 105 to bottom sensor housing 44b. The drive reference signals drive the fluxgate pairs of sensor housings 44a, 44b. The respective output signals from the fluxgate pairs are received by ASIC 94 over second wire 102. In particular, the output signal from the fluxgate pair of top sensor housing 44a travels over sixth wire 106 to bottom sensor housing 44b, this output signal and the output signal from the fluxgate pair of bottom sensor housing 44a travel over seventh wire 107 to top sensor housing 44a, and the two output signals then travel from top sensor housing 44a to ASIC 94 over second wire 102.

ASIC 94 also provides a drive reference signal over third wire 103 to top sensor housing 44a. This drive reference signal drives the thermistor. The output signal from the thermistor is received by ASIC 94 over fourth wire 106.

As such, ASIC 94 includes the following inputs: power supply and ground. ASIC 94 further includes a reflash 1 input and a reflash 2 input. Reflash 1 and reflash 2 inputs are provided individually by ASIC to sensor housings 44a, 44b in order to reset or reconfigure the fluxgate pairs. ASIC 94 provides such reflash signals to sensor housings 44a, 44b over first wire 101 and/or fifth wire 105 in lieu of the drive reference signals during the resetting or reconfiguration process. The outputs of ASIC 94 include the measured torque and measured temperature of the shaft.

As described, electronics interface assembly 90 includes three magnetized bands 46a, 46b, 46c on the shaft, two fluxgate pairs and a thermistor near the shaft, and the electronics. The magnetized bands are arranged in alternating polarity and the pair of fluxgates in each of sensor housings 44 within respective sensor windows 63 of the stator shaft read only two of the three magnetized bands. The fluxgates and the thermistor are enclosed in capsules (i.e., the sensor housings 44) to protect against contact with the transmission fluid. Sensor housings 44 are sized to place the fluxgates at a fixed location within the sensor windows 63. Sensor housings 44 are attached together by a lead frame which minimizes the size of the wiring channels, while providing placement of the wires during assembly and operation. The electronics also provide failure mode information, as well as temperature and torque signals to the PCM. Pulse width modulated signals are chosen as a means of communication to minimize the impact of noise on the signals.

Figure 8:
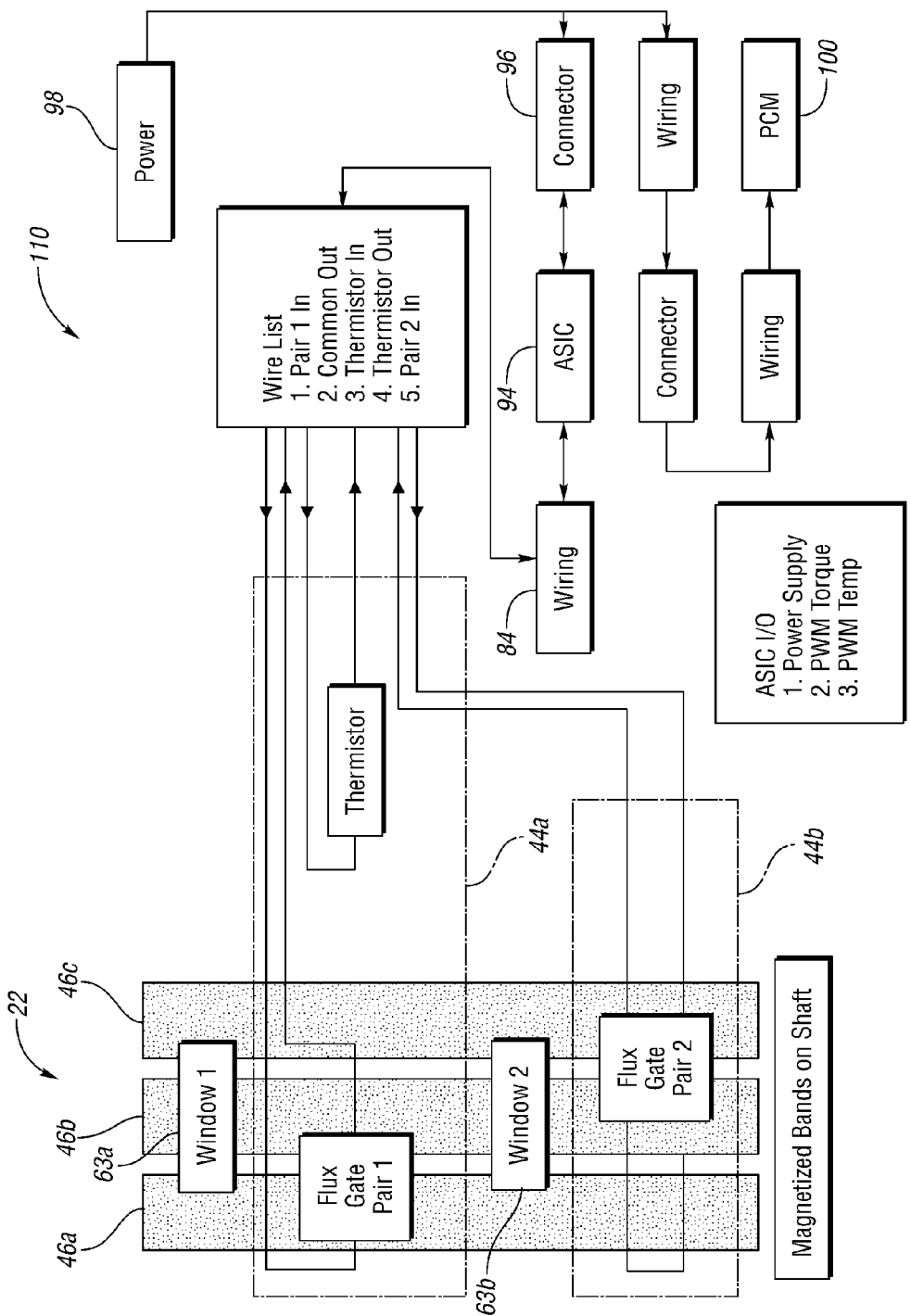
FIG. 8 illustrates a block diagram of a transmission shaft with an electronics interface assembly for a magnetic torque sensor in accordance with another embodiment of the present invention.

Referring now to FIG. 8, with continual reference to FIG. 7, a block diagram of a transmission shaft with an electronics interface assembly 110 for a magnetic torque sensor in accordance with another embodiment of the present invention is shown. The transmission shaft is the shaft of a transmission such as transmission 60 described with reference to FIGS. 6A-6G. Electronics interface assembly 110 is similar to electronics interface assembly 90 and like elements are labeled with the same reference numbers. One difference between the two assemblies is the lack of sixth and seventh wires 106 and 107 between sensor housings 44a, 44b. As such, electronics interface assembly 110 lacks a "common out" wire leading to ASIC 94 and instead includes two separate "out" wires leading to ASIC 94. Correspondingly, another difference is that ASIC 94 of electronics interface assembly 110 lacks the reflash capabilities of electronics interface assembly 90.

As described, various features of transmission 60 applicable to electronic interface assemblies 90 and 110 include the following. A region of a transmission shaft located inside of a torque converter stator support is magnetized. The torque converter stator support includes a housing of magnetic flux sensors (which may also be referred to as a bobbin, sensor housing, or PC board). The sensor housing includes one or more magnetic flux sensing elements such as fluxgates. The sensor housing may include other sensors such as a thermistor. Electrical wiring attached to the sensor housing is routed out of the transmission case through unique pathways designed into the stator support and its surrounding components. The stator support is uniquely divided into multiple sections to enable the placement of the sensor housing and the wiring.

As described, embodiments of the present invention are directed to automatic transmissions with electronic interface assemblies for magnetic torque sensors configured to sense torque and/or speed of input and/or output shafts in the transmissions. The exemplary transmission 60 described in conjunction with electronic interface assemblies 90 and 110 includes an input sensor for sensing torque of an input shaft. Of course, such electronic interface assemblies may be for an output sensor configured to sense torque of an output shaft. Likewise, other transmissions may be provided with various aspects of such electronic interface assemblies.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A transmission comprising:
a shaft;
sensors positioned adjacent respective pairs of magnetized bands on the shaft for detecting magnetic flux emanating from the bands in response to torque on the shaft; and
an electronics interface assembly configured to provide drive signals to the sensors and to receive from the sensors, in response to the drive signals, output signals indicative of the torque on the shaft as detected by the sensors.

2. The transmission of claim 1 wherein:
the electronics interface assembly includes a controller and wiring; and
the controller is connected to the sensors by the wiring, provides the drive signals to the sensors, and receives from the sensors, in response to the drive signals, the output signals indicative of the torque on the shaft as detected by the sensors.

3. The transmission of claim 2 wherein:
the drive signals are square wave signals.

4. The transmission of claim 2 wherein:
the controller is an application specific integrated circuit.

5. The transmission of claim 2 wherein:
the controller is connected to a power supply via the wiring.

6. The transmission of claim 5 wherein:
the electronics interface assembly further includes a connector; and
the connector is connected to one of the controller and the power supply to connect the controller to the power supply via the wiring.

7. The transmission of claim 2 wherein:
the wiring includes a plurality of wires;
the controller is connected to a first one of the sensors via a first one of the wires to provide one of the drive signals to the first one of the sensors; and
the controller is connected to a second one of the sensors via a second one of the wires to provide another one of the drive signals to the second one of the sensors.

8. The transmission of claim 7 wherein:
the controller is connected to the first one of the sensors via a third one of the wires to receive one of the output signals from the first one of the sensors; and
the controller is connected to the second one of the sensors via a fourth one of the wires to receive another one of the output signals from the second one of the sensors.

9. The transmission of claim 7 wherein:
the first one and the second one of the sensors are connected together by a wiring sub-assembly such that the first one and the second one of the sensors can communicate signals over the wiring sub-assembly; and
the controller is connected to the first one of the sensors via a third one of the wires to receive the output signals from the first one and the second one of the sensors.

10. The transmission of claim 7 further comprising:
a thermistor positioned adjacent one of the sensors for detecting temperature of the shaft; and
wherein the controller is further configured to provide a power signal to the thermistor and to receive from the thermistor, in response to the power signal, a temperature signal indicative of the temperature of the shaft.

11. The transmission of claim 10 wherein:
the controller is connected to the thermistor via a third one of the wires to provide the power signal to the thermistor; and
the controller is connected to the thermistor via a fourth one of the wires to receive the temperature signal from the thermistor.

12. The transmission of claim 7 wherein:
the controller is further configured to provide a reflash signal to the first one of the sensors via the first one of the wires; and
the controller is further configured to provide a reflash signal to the second one of the sensors via the second one of the wires.

13. The transmission of claim 1 wherein:
each sensor is positioned within a sensor housing adjacent to a respective pair of the magnetized bands.

14. The transmission of claim 1 wherein:
each sensor includes a pair of fluxgates.
15. The transmission of claim 1 wherein:
each sensor includes one or more fluxgates.

\* \* \* \* \*